United States Patent
Zhou et al.

(10) Patent No.: US 10,931,415 B2
(45) Date of Patent: Feb. 23, 2021

(54) COMMUNICATION METHOD AND APPARATUS

(71) Applicant: Beijing Xiaomi Mobile Software Co., Ltd., Beijing (CN)

(72) Inventors: Juejia Zhou, Beijing (CN); Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 44 days.

(21) Appl. No.: 16/325,731

(22) PCT Filed: Aug. 17, 2016

(86) PCT No.: PCT/CN2016/095766
§ 371 (c)(1),
(2) Date: Feb. 15, 2019

(87) PCT Pub. No.: WO2018/032434
PCT Pub. Date: Feb. 22, 2018

(65) Prior Publication Data
US 2019/0207728 A1    Jul. 4, 2019

(51) Int. Cl.
*H04W 56/00* (2009.01)
*H04L 5/00* (2006.01)
(Continued)

(52) U.S. Cl.
CPC ........ *H04L 5/0044* (2013.01); *H04L 27/2607* (2013.01); *H04W 28/0236* (2013.01);
(Continued)

(58) Field of Classification Search
CPC ............ H04L 5/0044; H04L 27/2607; H04W 28/0236; H04W 28/04; H04W 72/04; H04W 72/0446
(Continued)

(56) References Cited

U.S. PATENT DOCUMENTS

2005/0254555 A1*  11/2005  Teague ............... H04W 52/243
                                                                    375/136
2013/0136029 A1*   5/2013  Matsuo ............... H04W 72/042
                                                                    370/252
(Continued)

FOREIGN PATENT DOCUMENTS

CN        101360320 A        2/2009
CN        102474829 A        5/2012
(Continued)

OTHER PUBLICATIONS

International Search Report in international application No. PCT/CN2016/095766, dated May 8, 2017.
(Continued)

*Primary Examiner* — Sai Ming Chan
(74) *Attorney, Agent, or Firm* — Jun He Law Offices P.C.; James J. Zhu

(57) ABSTRACT

The present disclosure provides a communication method, apparatus and computer-readable medium, which belong to a technical field of mobile communication. The communication method includes: receiving, by a second base station, symbol configuration information of a first base station, wherein the symbol configuration information of the first base station is used to indicate an uplink/downlink symbol configuration in a subframe of the first base station; configuring, by the second base station, symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and communicating, by the second base station, according to the
(Continued)

configured symbol configuration information of the second base station.

17 Claims, 7 Drawing Sheets

(51) Int. Cl.
| | |
|---|---|
| *H04W 72/04* | (2009.01) |
| *H04W 28/04* | (2009.01) |
| *H04L 27/26* | (2006.01) |
| *H04W 28/02* | (2009.01) |

(52) U.S. Cl.
CPC .......... *H04W 28/04* (2013.01); *H04W 72/04* (2013.01); *H04W 72/0446* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0250882 A1* | 9/2013 | Dinan | ................... H04L 5/0032 370/329 |
| 2013/0294383 A1* | 11/2013 | Zhang | ................. H04W 72/082 370/329 |
| 2014/0146719 A1 | 5/2014 | Gao et al. | |

FOREIGN PATENT DOCUMENTS

| | | |
|---|---|---|
| JP | 2007538462 A | 12/2007 |
| JP | 2014523725 A | 9/2014 |
| WO | 2007097671 A1 | 8/2007 |
| WO | 2009131396 A2 | 10/2009 |
| WO | 2017052857 A1 | 3/2017 |

OTHER PUBLICATIONS

The Office Action in Japanese application No. 2017-510308, dated Aug. 21, 2018.
The extended European search report of European application No. 16913191.9, dated Feb. 19, 2020.

* cited by examiner

COMMUNICATION METHOD AND APPARATUS

CROSS-REFERENCE TO RELATED APPLICATION

This application is a national phase application of International Patent Application No. PCT/CN2016/095766, filed on Aug. 17, 2016, which is incorporated herein by reference in its entirety.

FIELD

The present disclosure relates to a technical field of mobile communication, and particularly, to a communication method, apparatus and computer-readable medium.

BACKGROUND

After years of development, the mobile communication technology has been improved to varying degrees in aspects such as, data transmission rate, coverage area, transmission delay, etc. For example, during communication, a base station may perform one or more data transmissions in a subframe in order to meet the requirement of a lower feedback delay.

Currently, during communication, a macro base station may obtain subframe configuration information of a micro base station, configure an uplink subframe possibly disturbing a transmission of the micro base station as a blank subframe according to the subframe configuration information of the micro base station and the macro base station, and then communicate based on the current subframe configuration, so as to avoid interference on a downlink transmission of the micro base station.

SUMMARY

In view of the fact in related arts, a communication method, apparatus and computer-readable medium are provided by the present disclosure.

According to a first aspect of embodiments of the disclosure, a communication method is provided, which may be applied to a second base station. The method includes: receiving, by the second base station, symbol configuration information of a first base station, wherein the symbol configuration information of the first base station is used to indicate an uplink/downlink symbol configuration in a subframe of the first base station; configuring, by the second base station, symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and communicating, by the second base station, according to the configured symbol configuration information of the second base station.

According to a second aspect of embodiments of the disclosure, a communication apparatus is provided, which may be applied to a second base station. The apparatus includes: a reception module, for receiving symbol configuration information of a first base station, wherein the symbol configuration information of the first base station is used to indicate an uplink/downlink symbol configuration in a subframe of the first base station; a configuration module, for configuring symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and a communication module, for communicating according to the configured symbol configuration information of the second base station.

According to a third aspect of embodiments of the disclosure, a communication apparatus is provided, which may be applied to a second base station. The apparatus includes: a processor; and a memory for storing instructions executable by the processor; wherein the processor is configured to: receive symbol configuration information of a first base station, wherein the symbol configuration information of the first base station is used to indicate an uplink/downlink symbol configuration in a subframe of the first base station; configure symbol configuration information of the second base station by configuring a specified symbol in a subframe of the second base station as a blank symbol, according to the symbol configuration information of the first base station and the symbol configuration information of the second base station, wherein the specified symbol is a symbol that is predicted to cause interference or to be intervened during communication; and communicate according to the configured symbol configuration information of the second base station.

According to a fourth aspect of embodiments of the disclosure, a non-transitory computer-readable storage medium having instructions stored thereon is provided. The instructions, when executed by a processor, cause the processor to perform a communication method applied to a second base station. The method includes: receiving, by the second base station, symbol configuration information of a first base station, wherein the symbol configuration information of the first base station is used to indicate an uplink/downlink symbol configuration in a subframe of the first base station; configuring, by the second base station, symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and communicating, by the second base station, according to the configured symbol configuration information of the second base station.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make the purposes, technical solutions and advantages of the present disclosure more clearly, embodiments of the present disclosure will be further detailed in connection with the accompanying drawings below.

Reference will now be made in detail to exemplary embodiments, examples of which are illustrated in the accompanying drawings. The following description refers to the accompanying drawings in which same reference numbers in different drawings represent same or similar elements unless otherwise described. The implementations set forth in the following description of exemplary embodiments do not represent all implementations consistent with the disclosure. Instead, they are merely examples of apparatus and methods consistent with aspects related to the disclosure as recited in the appended claims.

Figure 1:
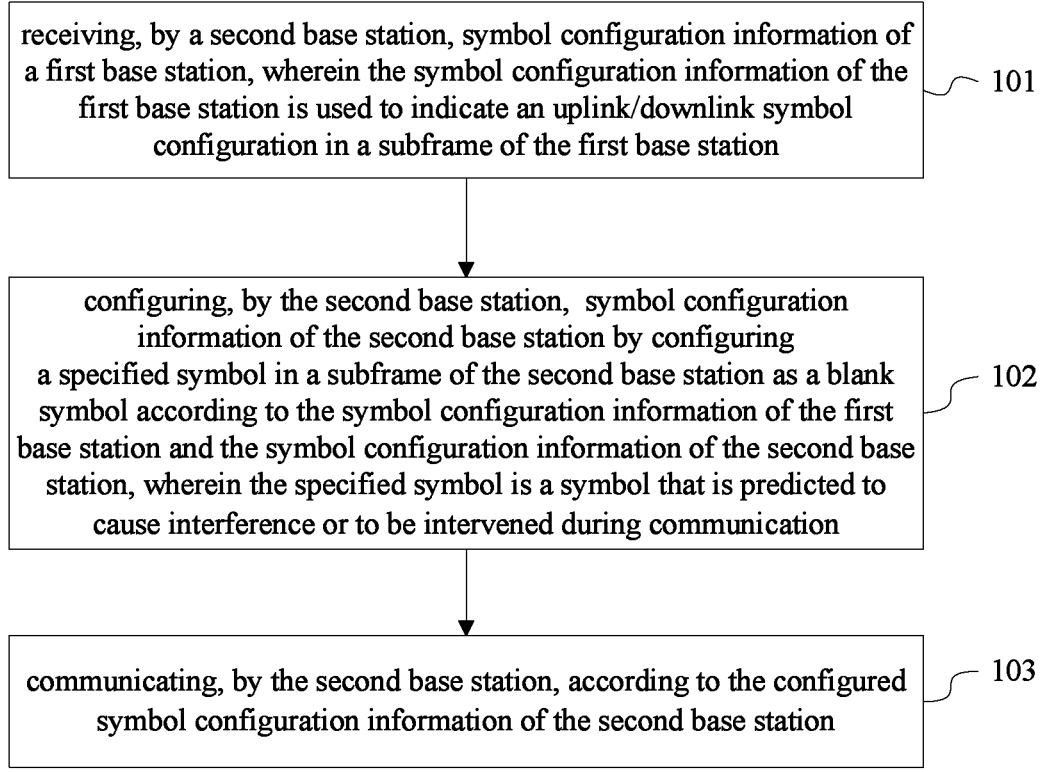
FIG. 1 illustrates a flow diagram of a communication method according to an exemplary embodiment.

FIG. 1 illustrates a flow diagram of a communication method according to an exemplary embodiment. The communication method may be applied to a second base station. As shown in FIG. 1, the communication method may include the following steps 101-103.

In step 101, the second base station receives symbol configuration information of a first base station. The symbol configuration information of the first base station is used to indicate an uplink/downlink symbol configuration in a subframe of the first base station.

In step 102, the second base station configures symbol configuration information of the second base station by configuring a specified symbol in a subframe of the second base station as a blank symbol according to the symbol configuration information of the first base station and symbol configuration information of the second base station. The specified symbol is a symbol that is predicted to cause interference or to be intervened during communication.

In step 103, the second base station communicates according to the configured symbol configuration information of the second base station.

In related arts, a macro base station configures a whole subframe as a blank subframe, in order to avoid interference on downlink communication of an associated base station. The manner in which the whole subframe is configured as the blank subframe not only wastes subframe resources but also delays a communication progress of the second base station. As a result, communication efficiency of the second base station is very low.

Embodiments of the present disclosure avoid interference on the communication of the first base station on downlink symbols by configuring a symbol that is predicted to cause interference or to be intervened during the communication of the second base station as a blank symbol. Since a symbol is a smaller time span within a subframe, as compared with related arts, the approach to configure a specified symbol in a subframe of the second base station as a blank symbol may not only save subframe resources, but also would not cause too much delay in a communication progress of the second base station. Therefore, communication efficiency is improved.

In a possible implementation, the method may include: receiving, by the second base station, the symbol configuration information sent by the first base station after establishment of the second base station. In another possible implementation, the method may include: receiving, by the second base station, the symbol configuration information sent by the first base station after a change of symbol configuration information of the first base station. In another possible implementation, the method may include: receiving, by the second base station, the symbol configuration information sent by the first base station after a change of business requirement of the first base station.

In a possible implementation, the method may include: when the subframes of both the first base station and the second base station include one or more uplink symbols and downlink symbols, determining, by the second base station, one or more overlap positions of the one or more uplink symbols of the second base station and the one or more downlink symbols of the first base station, and configuring, by the second base station, one or more uplink symbols at the one or more overlap positions as the blank symbol. In another possible implementation, the method may include: when the subframe of the first base station includes one or more uplink symbols and downlink symbols and the subframe of the second base station includes one or more uplink symbols without any downlink symbol, configuring, by the second base station, each of the uplink symbols in the subframe of the second base station as the blank symbol. In another possible implementation, the method may include: when the subframe of the second base station includes one or more uplink symbols and downlink symbols and the subframe of the first base station includes one or more downlink symbols without any uplink symbol, configuring, by the second base station, each of the uplink symbols in the subframe of the second base station as the blank symbol.

In a possible implementation, the method may further include: when the symbol configuration information of the first base station does not include all symbol configuration information in the subframe of the first base station, determining, by the second base station, a position of a target symbol and configuring, by the second base station, an uplink symbol corresponding to the position of the target symbol in the subframe of the second base station as the blank symbol. The target symbol is a symbol that is not included in the symbol configuration information in the subframe of the first base station. All symbol configuration information in the subframe may include configuration information about all symbols in the subframe.

In a possible implementation, the method may further include: when the symbol configuration information of the second base station includes an unspecified symbol and the symbol configuration information of the first base station does not include an unspecified symbol, configuring, by the second base station, the unspecified symbol at a position corresponding to a downlink symbol of the first base station as the blank symbol. In another possible implementation, the method may further include: when the symbol configuration information of the first base station includes an unspecified symbol and the symbol configuration information of the second base station does not include an unspecified symbol, determining, by the second base station, a position of the unspecified symbol, and configuring, by the second base station, an uplink symbol corresponding to the position of the unspecified symbol in the subframe of the second base station as the blank symbol. In another possible implementation, the method may further include: when both the symbol configuration information of the second base station and the first base station includes an unspecified symbol, configuring, by the second base station, the unspecified symbol of the second base station at a position corresponding to a downlink symbol of the first base station as the blank symbol, determining, by the second base station, an uplink symbol at a position corresponding to the unspecified symbol of the first base station in the subframe of the second station, and configuring, by the second base station, the uplink symbol at the corresponding position as the blank symbol.

In a possible implementation, the method may include: transmitting, by the second base station, the configured symbol configuration information to a user equipment (UE), such that the UE does not communicate on the blank symbol. In another possible implementation, the method may include: transmitting, by the second base station, the configured symbol configuration information to a user equipment (UE), such that the UE communicates on the blank symbol with a predetermined power.

In a possible implementation, the first base station is a micro base station within coverage of the second base station. In another possible implementation, the first base station is a macro base station having overlap coverage with the second base station. In another possible implementation, the first base station is adjacent to the second base station.

All the optional technical solutions described above may form alternative embodiments of the present disclosure in any combinations, which will not be detailed herein.

Figures 2A, 2B:
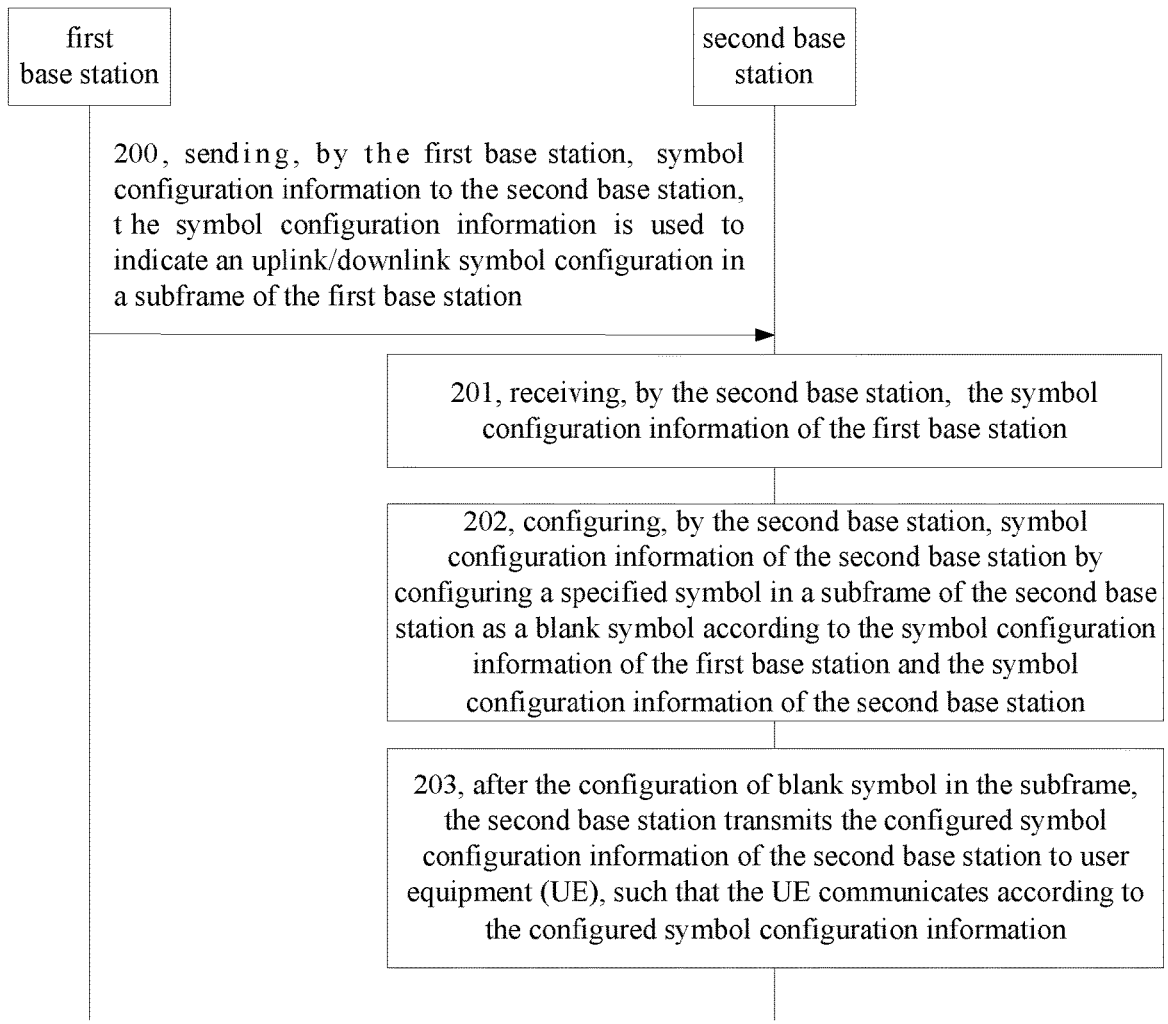
FIG. 2A illustrates a schematic diagram of a subframe format according to an exemplary embodiment.
FIG. 2B illustrates a flow diagram of a communication method according to an exemplary embodiment.

FIG. 2A illustrates a schematic diagram of a subframe format according to an exemplary embodiment. As shown in FIG. 2A, a subframe may include but is not limited to one or more uplink symbols and/or downlink symbols. A base station may perform uplink communication on the uplink symbols and perform downlink communication on the downlink symbols.

Additionally, when a base station is switched from downlink communication to uplink communication, there is a protection period to avoid interference on uplink communication of the base station from downlink communication of an associated base station.

FIG. 2B illustrates a flow diagram of a communication method according to an exemplary embodiment. As shown in FIG. 2B, the communication method may be applied to a base station. The communication method may include the following steps.

In step 200, a first base station sends its symbol configuration information to a second base station. The symbol configuration information of the first base station is used to indicate an uplink/downlink symbol configuration in a subframe of the first base station.

In embodiments of the present disclosure, the first base station is associated with the second base station. In an example, when the second station is a macro station, the first base station may be a micro base station within coverage of the second base station. In another example, when the second station is a micro station, the first base station may be a macro base station having overlap coverage with the second base station. In another example, the first base station may be adjacent to the second base station. Embodiments of the present disclosure are not limited thereto.

The symbol configuration information may include but is not limited to a category of the symbol in the subframe (such as, an uplink symbol, a downlink symbol), a position of a symbol in the subframe and a position of a protection period in the subframe.

In practice, a provider may decide whether the second base station should avoid interference on the first base station according to a degree of the interference on the first base station or a decision on business requirement. If so, the first base station sends its symbol configuration information to the second base station. There may be three cases as follows. However, embodiments of the present disclosure are not limited thereto.

For example, after its establishment, the first base station may send the symbol configuration information to the second base station.

For example, the second base station may start to interfere the first base station or keep interfering the first base station, after the symbol configuration information of the first station changes. Thereby, in another embodiment of the present disclosure, the first base station may send the symbol configuration information to the second base station after a change of the symbol configuration information of the first base station.

For example, after a change of business requirement of the first base station, the operator may decide that the second base station should avoid interference on the first base station. Thereby, in another embodiment of the present disclosure, the first base station may send the symbol configuration information to the second base station after a change of business requirement of the first base station.

In step 201, the second base station receives the symbol configuration information of the first base station.

It is to be noted that the first base station and the second base station are geographically located closely to each other and thus when uplink communication of the second base station and downlink communication of the first base station are performed in the same subframe, the uplink communication of the second base station may interfere the downlink communication of the first base station. Therefore, the second base station may avoid the interference on the communication of the first base station based on the situations.

In practice, the second base station may determine whether to avoid the interference according to its communication situation or the communication requirement of the first base station, which is not limited herein. If the avoidance is needed, the method proceeds to step 202. If the avoidance is not needed, the method ends. For example, when communication efficiency of the second base station is poor or the communication quality requirement of the first base station is low during a certain period, the second base station does not need to avoid the interference, and then step 202 may not be performed.

In step 202, the second base station configures symbol configuration information of the second base station by configuring a specified symbol in a subframe of the second base station as a blank symbol according to the symbol configuration information of the first base station and the symbol configuration information of the second base station. The specified symbol is a symbol that is predicted to cause interference or to be intervened during communication.

It is to be noted that based on the symbol configuration information of the first base station and the symbol configuration information of the second base station, the second base station may be aware of particular configurations of the subframes of both the first and second base stations (for example, a position of an uplink/downlink symbol), and then determine an overlap part of one or more uplink symbols of the second base station and one or more downlink symbols of the first base station. An uplink symbol in the overlap part may be taken as the specified symbol, which is predicted to cause interference or to be intervened during communication.

In embodiments of the disclosure, when the received symbol configuration information of the first base station includes all symbol configuration information in the subframe of the first base station. For example, the subframe as shown in FIG. 2A includes all symbol configuration information in the subframe, i.e., each symbol position in the subframe has a corresponding uplink symbol, downlink symbol or protection period. According to interference situations, in order to avoid that uplink communication of the second base station may disturb downlink communication of the first base station, there may be at least three ways to configure the blank symbol.

As the first way, when the subframes of both the first base station and the second base station include one or more uplink symbols and downlink symbols, one or more overlap positions of the one or more uplink symbols of the second base station and the one or more downlink symbols of the first base station may be determined, and one or more uplink symbols at the one or more overlap positions are configured as the blank symbol.

Figure 3:
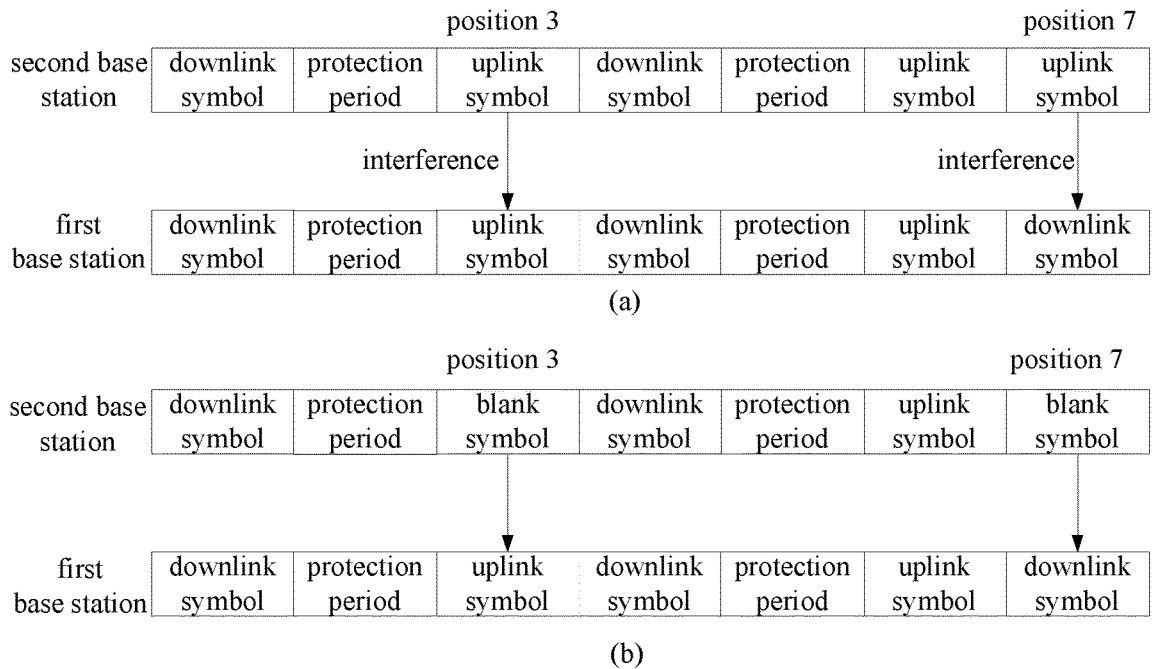
FIG. 3 illustrates a schematic diagram for configuring a blank symbol according to an exemplary embodiment.

For example, FIG. 3 illustrates a schematic diagram for configuring a blank symbol according to an exemplary embodiment. As shown in (a) of FIG. 3, before configuration of the blank symbol, uplink symbols of the second base station and downlink symbols of the first base station are overlapped at positions 3 and 7. As a result, when communicating on the uplink symbols of the positions 3 and 7, the second base station may interfere downlink communication of the first base station. Therefore, as shown in (b) of FIG. 3, the uplink symbols of the overlapped part are configured as blank symbols, in order to avoid the interference.

As the second way, when the subframe of the first base station includes one or more uplink symbols and downlink symbols and the subframe of the second base station includes one or more uplink symbols without any downlink symbol, each of the uplink symbols in the subframe of the second base station is configured as the blank symbol.

Figure 4:
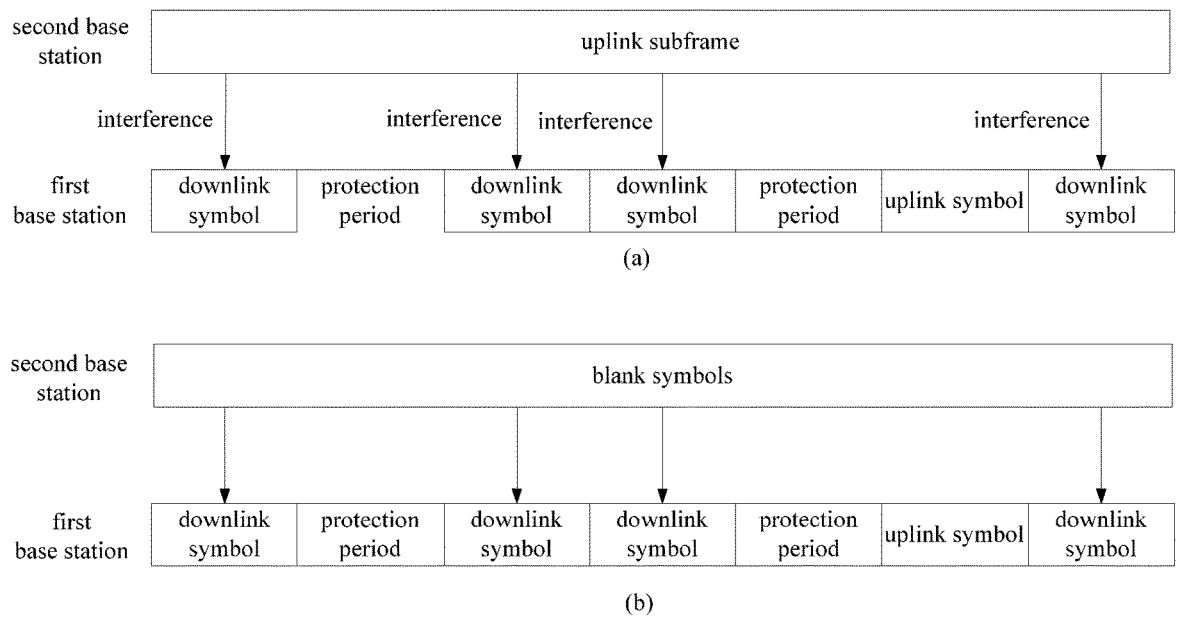
FIG. 4 illustrates a schematic diagram for configuring a blank symbol according to an exemplary embodiment.

For example, FIG. 4 illustrates a schematic diagram for configuring a blank symbol according to an exemplary embodiment. As shown in (a) of FIG. 4, before configuration of the blank symbol, communication on the uplink symbols of the second base station may interfere communication on downlink symbols of the first base station. Therefore, as shown in (b) of FIG. 4, all uplink symbols of the second base station are configured as blank symbols, in order to avoid the interference.

As the third way, when the subframe of the second base station includes one or more uplink symbols and downlink symbols and the subframe of the first base station includes one or more downlink symbols without any uplink symbol, each of the uplink symbols in the subframe of the second base station as the blank symbol is configured as the blank symbol.

Figure 5:
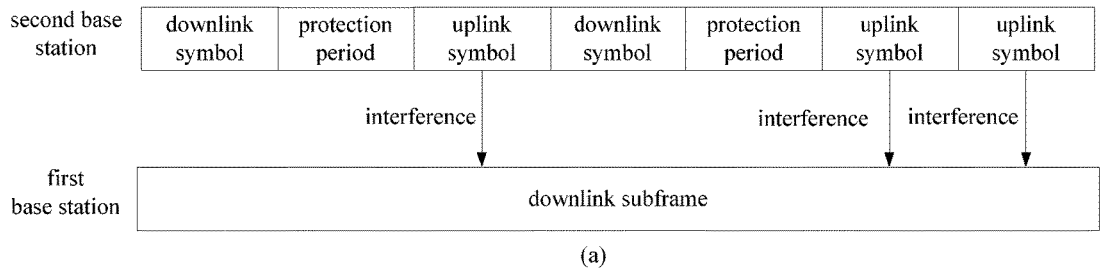
FIG. 5 illustrates a schematic diagram for configuring a blank symbol according to an exemplary embodiment.
Figure 5:
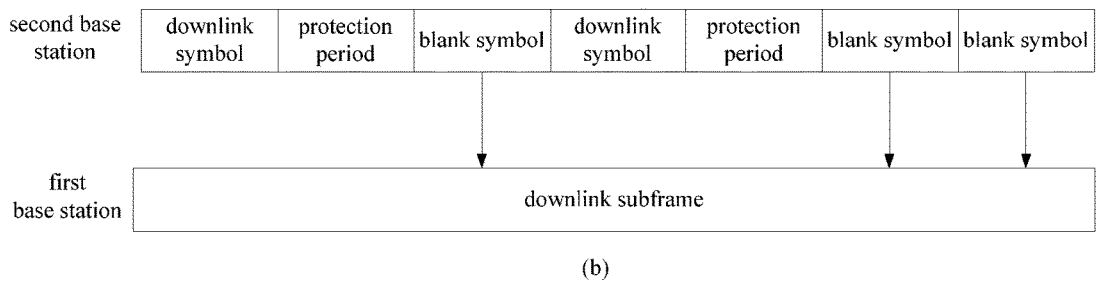

For example, FIG. 5 illustrates a schematic diagram for configuring a blank symbol according to an exemplary embodiment. As shown in (a) of FIG. 5, before configuration of the blank symbol, communication on each of the uplink symbols of the second base station may interfere communication on a corresponding downlink symbol of the first base station. Therefore, as shown in (b) of FIG. 5, all uplink symbols of the second base station are configured as blank symbols, in order to avoid the interference.

In practice, the received symbol configuration information of the first base station may not include all configuration information about symbols in the subframe. Since symbol configuration information is incomplete, a target symbol may be an uplink symbol. In this situation, when a symbol at the position corresponding to the target symbol in the subframe of the second base station is an uplink symbol, interference may occur. The target symbol is a symbol included in the subframe of the first station and but is not included in the symbol configuration information.

Figure 6:
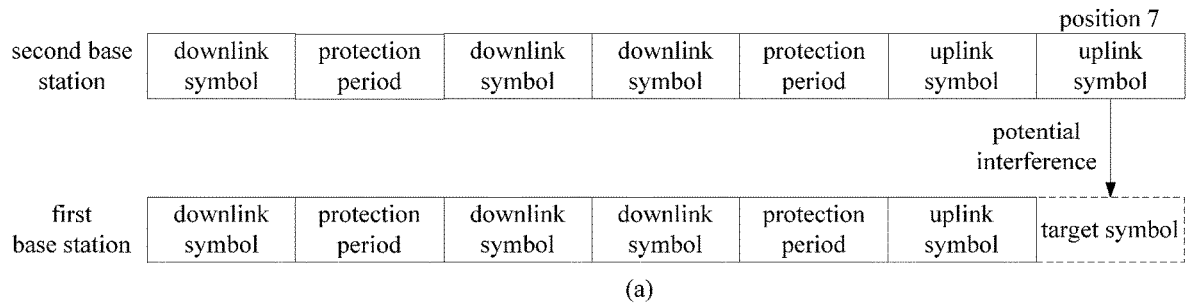
FIG. 6 illustrates a schematic diagram for configuring a blank symbol according to an exemplary embodiment.
Figure 6:
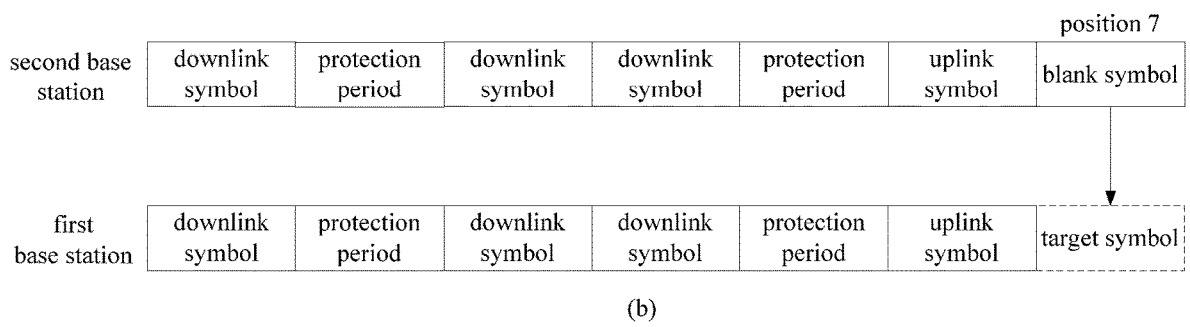

For example, FIG. 6 illustrates a schematic diagram for configuring a blank symbol according to an exemplary embodiment. As shown in (a) of FIG. 6, there is a target symbol at the symbol position 7 of the subframe of the first base station. In order to avoid potential interference on communication on the target symbol of the first base station, as shown in (b) of FIG. 6, the position of the target symbol is determined, and the uplink symbol at the position corresponding to the target symbol in the subframe of the second base station is configured as the blank symbol.

Taking the case that the subframe includes an unspecified symbol into consideration, the second station cannot determine an actual configuration of the unspecified symbol before communication, since the unspecified symbol may be an uplink symbol or a downlink symbol during practical communication. Therefore, either when an unspecified symbol of the second base station is an uplink symbol or when an unspecified symbol of the first base station is a downlink symbol, the second base station may disturb the first base station's communication. Thereby, in embodiments of the disclosure, there may be at least three ways to configure the blank symbol, in order to avoid the potential interference.

As the fourth way, when the symbol configuration information of the second base station includes an unspecified symbol and the symbol configuration information of the first base station does not include an unspecified symbol, the unspecified symbol at a position corresponding to a downlink symbol of the first base station is configured as the blank symbol.

Figure 7:
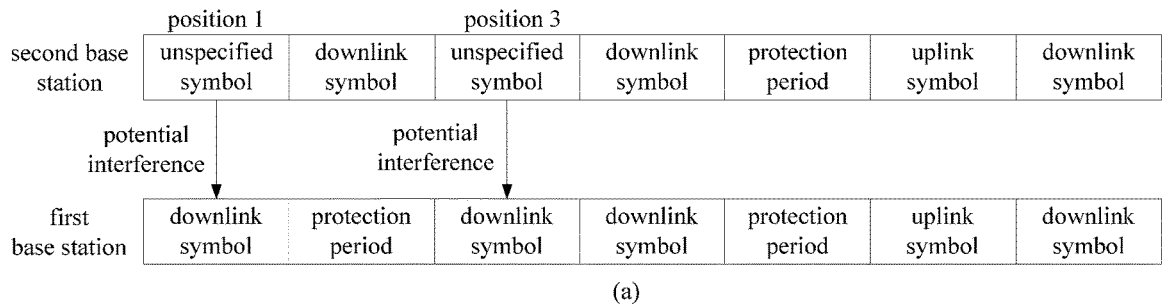
FIG. 7 illustrates a schematic diagram for configuring a blank symbol according to an exemplary embodiment.
Figure 7:
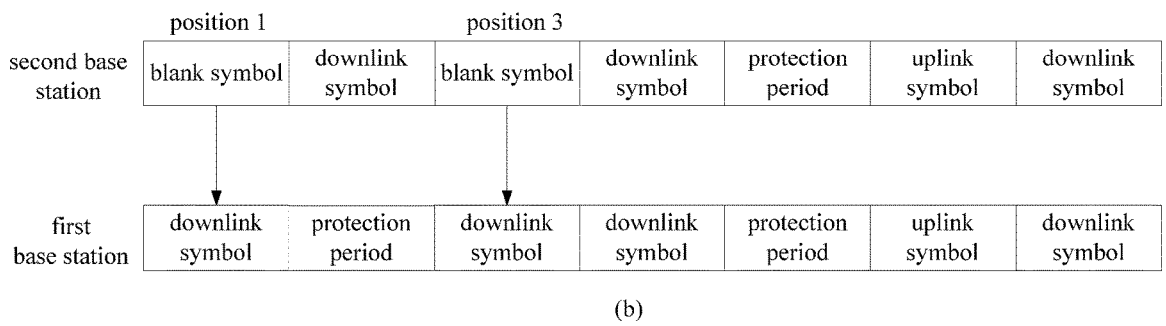

For example, FIG. 7 illustrates a schematic diagram for configuring a blank symbol according to an exemplary embodiment. As shown in (a) of FIG. 7, there are unspecified symbols at the symbol positions 1 and 3 of the subframe of the second base station. In order to avoid interference on communication on positions of the first base station corresponding to the unspecified symbols when the second base station performs uplink communication on the unspecified symbols, as shown in (b) of FIG. 7, the unspecified symbols are configured as blank symbols.

As the fifth way, when the symbol configuration information of the first base station includes an unspecified symbol and the symbol configuration information of the second base station does not include an unspecified symbol, a position of the unspecified symbol is determined, and an uplink symbol corresponding to the position of the unspecified symbol in the subframe of the second base station is configured as the blank symbol.

Figure 8:
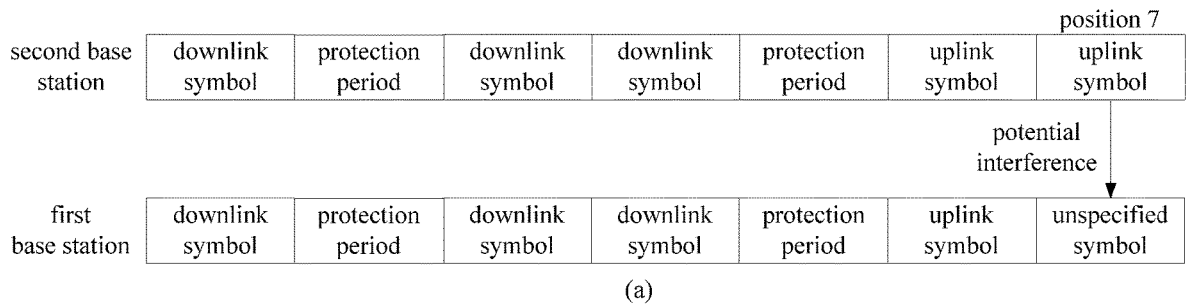
FIG. 8 illustrates a schematic diagram for configuring a blank symbol according to an exemplary embodiment.
Figure 8:
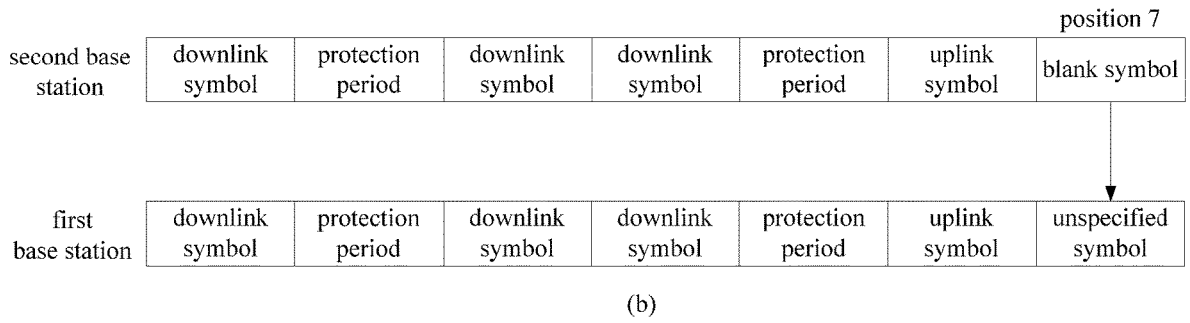

For example, FIG. 8 illustrates a schematic diagram for configuring a blank symbol according to an exemplary embodiment. As shown in (a) of FIG. 8, there is an unspecified symbol at the symbol position 7 of the subframe of the first base station. If downlink communication is performed on the unspecified symbol, as shown in (b) of FIG. 8, in order to avoid interference from uplink communication of the second base station on an uplink symbol corresponding to the unspecified symbol, the uplink symbol at the symbol position 7 of the subframe of the second base station is configured as the blank symbol.

As the sixth way, when both the symbol configuration information of the second base station and the first base station includes an unspecified symbol, the second base station configures the unspecified symbol of the second base station at a position corresponding to a downlink symbol of the first base station as the blank symbol; and an uplink symbol at a position corresponding to the unspecified symbol of the first base station in the subframe of the second station is determined and the uplink symbol at the corresponding position is configured as the blank symbol.

Figure 9:
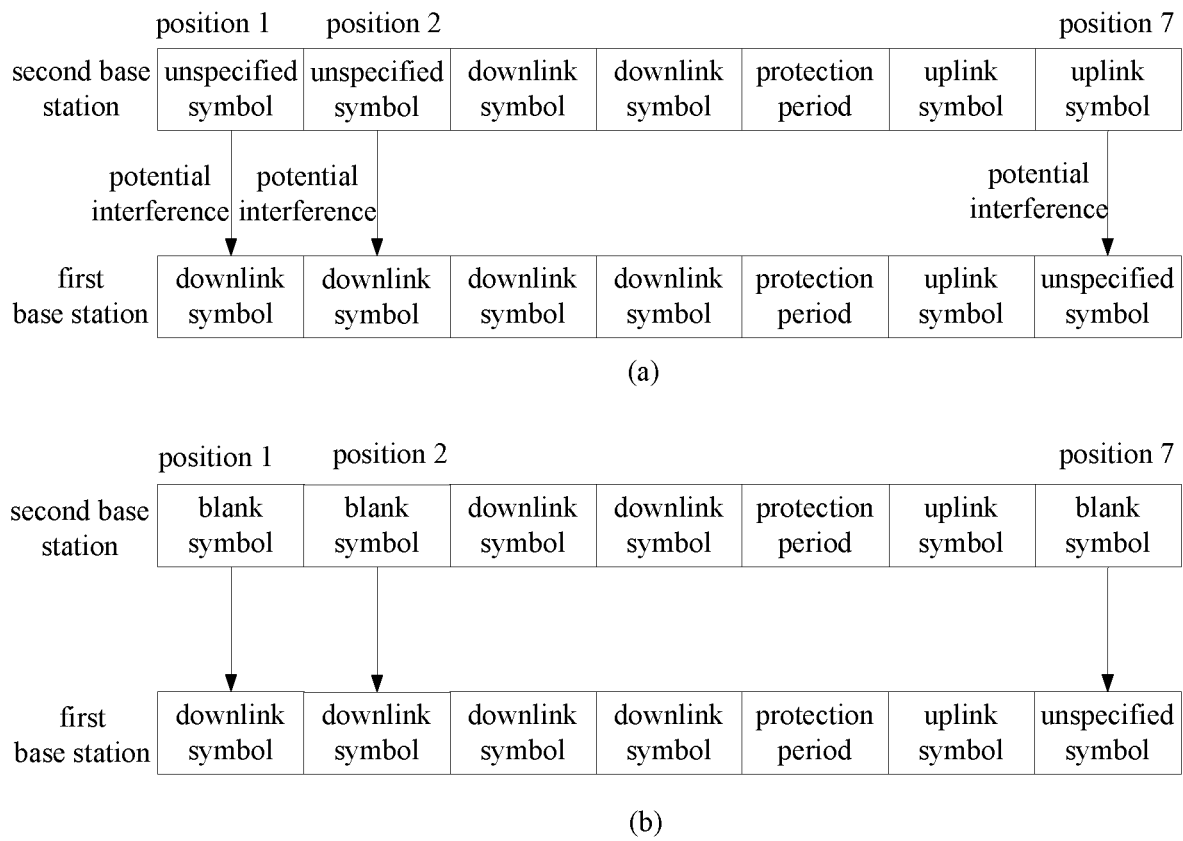
FIG. 9 illustrates a schematic diagram for configuring a blank symbol according to an exemplary embodiment.

For example, FIG. 9 illustrates a schematic diagram for configuring a blank symbol according to an exemplary embodiment. As shown in (a) of FIG. 9, there are unspecified symbols at the symbol positions 1 and 2 of the subframe of the second base station. In order to avoid interference on communication on positions 1 and 2 of the first base station, the unspecified symbols at the symbol positions 1 and 2 of the subframe of the second base station are configured as blank symbols. Further, there is an unspecified symbol at the symbol position 7 of the subframe of the first base station. In order to avoid interference when uplink communication is performed on the uplink symbol at the symbol position 7 of the subframe of the second base station, as shown in (b) of FIG. 9, the uplink symbol at the symbol position 7 is configured as the blank symbol.

In step 203, after the configuration of blank symbol in the subframe, the second base station transmits the configured symbol configuration information to a user equipment (UE), such that the UE communicates according to the configured symbol configuration information.

In an embodiment of the present disclosure, the configured symbol configuration information may be first symbol configuration information. When the second base station transmits the first symbol configuration information to the UE, the UE does not communicate on the blank symbol and performs uplink communication on other symbols except for the blank symbol, so as to avoid interference on the first base station's communication.

In order to ensure the communication efficiency of the second base station while avoiding interference on the first base station, in another embodiment of the present disclosure, the configured symbol configuration information may be second symbol configuration information which carries a predetermined power preset by the second base station for the UE. For example, the predetermined power may be 50% of the original power, which is not limited herein. When the second base station transmits the second symbol configuration information to the UE, the UE communicates on the blank symbol with the predetermined power, and communicates normally on other symbols except for the blank symbol.

In related arts, a macro base station configures a whole subframe as a blank subframe, in order to avoid interference on downlink communication of an associated base station. The manner in which the whole subframe is configured as the blank subframe not only wastes subframe resources but also delays a communication progress of the second base station. As a result, communication efficiency of the second base station is very low.

Embodiments of the present disclosure avoid interference on the communication of the first base station on downlink symbols by configuring a symbol that is predicted to cause interference or to be intervened during the communication of the second base station as a blank symbol. Since a symbol is a smaller time span within a subframe, as compared with related arts, the approach to configure a specified symbol as a blank symbol may not only save subframe resources, but also would not cause too much delay in a communication progress of the second base station. Therefore, communication efficiency is improved.

Additionally, in some embodiments of the present disclosure, the second base station enables UE to communicate with the predetermined power, so as to ensure communication efficiency of the second base station, while avoiding interference on the first base station's communication.

Figure 10:
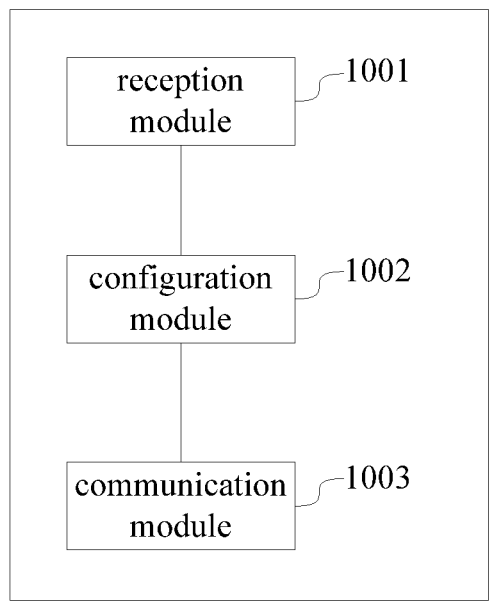
FIG. 10 illustrates a block diagram of a communication apparatus according to an exemplary embodiment.

FIG. 10 illustrates a block diagram of a communication apparatus according to an exemplary embodiment. As shown in FIG. 10, the communication apparatus may be applied to a second base station. The communication apparatus may include a reception module 1001, a configuration module 1002 and a communication module 1003.

The reception module 1001 is configured to receive symbol configuration information of a first base station. The symbol configuration information of the first base station is used to indicate an uplink/downlink symbol configuration in a subframe of the first base station.

The configuration module 1002 is configured to configure symbol configuration information of the second base station by configuring a specified symbol in a subframe of the second base station as a blank symbol, according to the symbol configuration information of the first base station and the symbol configuration information of the second base station. The specified symbol is a symbol that is predicted to cause interference or to be intervened during communication.

The communication module 1003 is configured to communicate according to configured symbol configuration information of the second base station.

In a possible implementation, the reception module 1001 is configured to receive the symbol configuration information sent by the first base station after establishment of the second base station. In another possible implementation, the reception module 1001 is configured to receive the symbol configuration information sent by the first base station after a change of symbol configuration information of the first base station. In another possible implementation, the reception module 1001 is configured to receive the symbol configuration information sent by the first base station after a change of business requirement of the first base station.

In a possible implementation, the configuration module 1002 is configured to: when the subframes of both the first base station and the second base station include one or more uplink symbols and downlink symbols, determine one or more overlap positions of the one or more uplink symbols of the second base station and the one or more downlink symbols of the first base station and configure one or more uplink symbols at the one or more overlap positions as the blank symbol. In another possible implementation, the configuration module 1002 is configured to: when the subframe of the first base station includes one or more uplink symbols and downlink symbols and the subframe of the second base station includes one or more uplink symbols without any downlink symbol, configure each of the uplink symbols in the subframe of the second base station as the blank symbol. In another possible implementation, the configuration module 1002 is configured to: when the subframe of the second base station includes one or more uplink symbols and downlink symbols and the subframe of the first base station includes one or more downlink symbols without any uplink symbol, configure each of the uplink symbols in the subframe of the second base station as the blank symbol.

In a possible implementation, the configuration module 1002 is further configured to: when the symbol configuration information of the first base station does not include all symbol configuration information in the subframe of the first base station, determine a position of a target symbol and configure an uplink symbol corresponding to the position of the target symbol in the subframe of the second base station as the blank symbol. The target symbol is a symbol that is not included in the symbol configuration information in the subframe of the first base station.

In a possible implementation, the configuration module 1002 is further configured to: when the symbol configuration information of the second base station includes an unspecified symbol and the symbol configuration information of the first base station does not include an unspecified symbol, configure the unspecified symbol at a position corresponding to a downlink symbol of the first base station as the blank symbol. In another possible implementation, the configuration module 1002 is further configured to: when the symbol configuration information of the first base station includes an unspecified symbol and the symbol configuration information of the second base station does not include an unspecified symbol, determine a position of the unspecified symbol and configure an uplink symbol corresponding to the position of the unspecified symbol in the subframe of the second base station as the blank symbol. In another possible implementation, the configuration module 1002 is further configured to: when both the symbol configuration information of the second base station and the first base station include an unspecified symbol, configure the unspecified symbol of the second base station at a position corresponding to a downlink symbol of the first base station as the blank symbol, determine an uplink symbol at a position corresponding to the unspecified symbol of the first base station in the subframe of the second station, and configure the uplink symbol at the corresponding position as the blank symbol.

In a possible implementation, the communication module 1003 is configured to: transmit the configured symbol configuration information to a user equipment (UE), such that the UE does not communicate on the blank symbol. In another possible implementation, the communication module 1003 is configured to transmit the configured symbol configuration information to a user equipment (UE), such that the UE communicates on the blank symbol with a predetermined power.

In a possible implementation, the first base station is a micro base station within coverage of the second base station. In another possible implementation, the first base station is a macro base station having overlap coverage with the second base station. In another possible implementation, the first base station is adjacent to the second base station.

In related arts, a macro base station configures a whole subframe as a blank subframe, in order to avoid interference on downlink communication of an associated base station. The manner in which the whole subframe is configured as the blank subframe not only wastes subframe resources but also delays a communication progress of the second base station. As a result, communication efficiency of the second base station is very low.

Embodiments of the present disclosure avoid interference on the communication of the first base station on downlink symbols by configuring a symbol that is predicted to cause interference or to be intervened during the communication of the second base station as a blank symbol. Since a symbol is a smaller time span within a subframe, as compared with related arts, the approach to configure a specified symbol as a blank symbol may not only save subframe resources, but also would not cause too much delay in a communication progress of the second base station. Therefore, communication efficiency is improved.

Additionally, in some embodiments of the present disclosure, the second base station enables UE to communicate with the predetermined power, so as to ensure communication efficiency of the second base station, while avoiding interference on the first base station's communication.

Regarding the apparatus described in the above embodiments, the specific manner in which each of the modules performs corresponding operations has been described in details in the related method embodiments, which will not be detailed herein.

Embodiments of the disclosure further provide apparatus embodiments for implementing the steps and method of the above method embodiments. Embodiments of the present disclosure may be applied to a base station in various communication systems.

Figure 11:
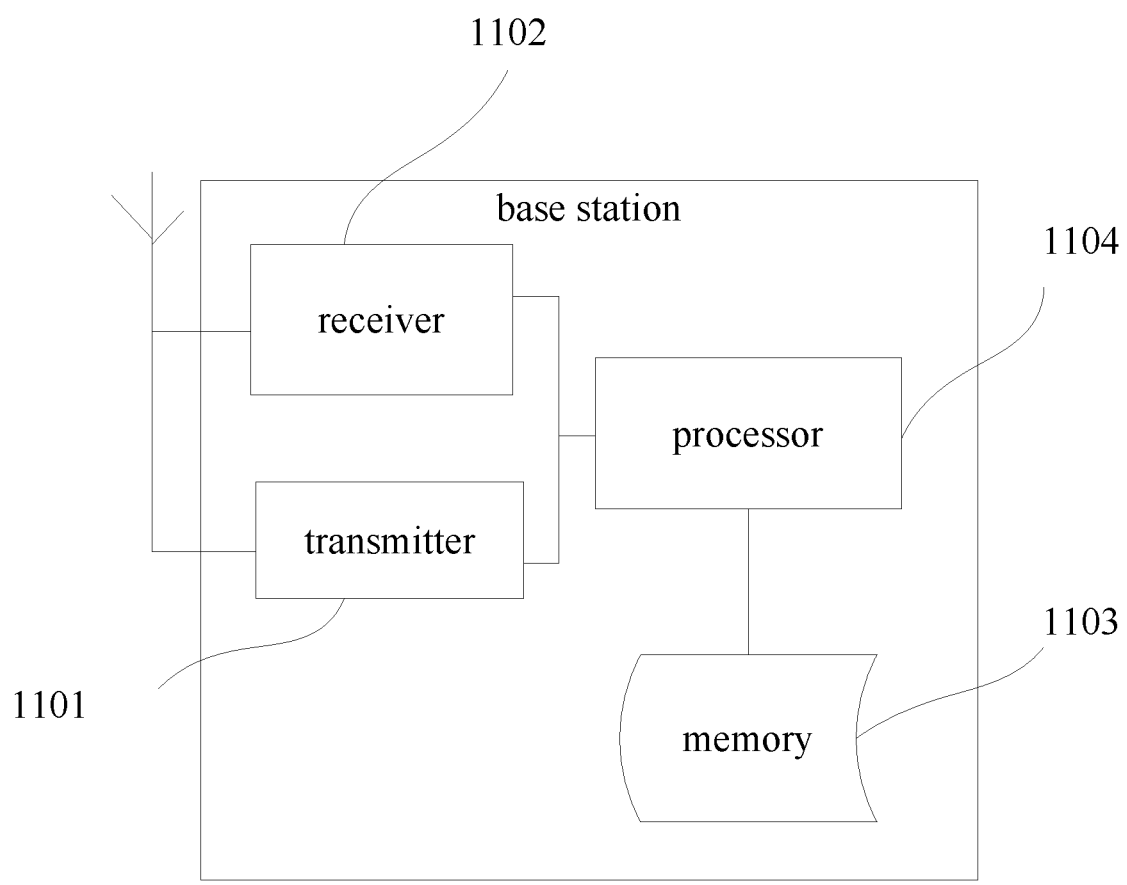
FIG. 11 illustrates a structure diagram of a base station according to an exemplary embodiment.

Referring to FIG. 11, FIG. 11 is a structure diagram of a base station provided by an embodiment of the disclosure. As shown, the base station may include a transmitter 1101, a receiver 1102, a memory 1103 and a processor 1104 connected with the transmitter 1101, receiver 1102 and memory 1103 respectively. Certainly, the base station may also include general purpose components, such as, an antenna, a baseband processing component, an intermediate frequency processing component, input/output (I/O) means and so on. Embodiments of the present disclosure are not limited herein.

The processor is configured to perform a method according to any of the potential implementations provided by the above embodiments.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A communication method applied to a second base station, comprising:
receiving, by the second base station, symbol configuration information of a first base station, wherein the symbol configuration information of the first base station is used to indicate an uplink/downlink symbol configuration in a subframe of the first base station;
configuring, by the second base station, symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and communicating, by the second base station, according to the configured symbol configuration information of the second base station, wherein the method further comprises:

when the symbol configuration information of the first base station does not comprise all symbol configuration information in the subframe of the first base station, determining, by the second base station, a position of a target symbol and configuring, by the second base station, an uplink symbol corresponding to the position of the target symbol in the subframe of the second base station as the blank symbol, wherein the target symbol is a symbol that is not included in the symbol configuration information in the subframe of the first base station.

2. The method of claim 1, wherein the receiving, by the second base station, the symbol configuration information of the first base station comprises:

receiving, by the second base station, the symbol configuration information sent by the first base station after establishment of the second base station.

3. The method of claim 1, wherein the configuring, by the second base station, the symbol configuration information of the second base station by configuring the specified symbol in the subframe of the second base station as the blank symbol according to the symbol configuration information of the first base station and the symbol configuration information of the second base station comprises:

when the subframes of both the first base station and the second base station comprise one or more uplink symbols and downlink symbols, determining, by the second base station, one or more overlap positions of the one or more uplink symbols of the second base station and the one or more downlink symbols of the first base station, and configuring, by the second base station, one or more uplink symbols at the one or more overlap positions as the blank symbol; or when the subframe of the first base station comprises one or more uplink symbols and downlink symbols and the subframe of the second base station comprises one or more uplink symbols without any downlink symbol, configuring, by the second base station, each of the uplink symbols in the subframe of the second base station as the blank symbol; or when the subframe of the second base station comprises one or more uplink symbols and downlink symbols and the subframe of the first base station comprises one or more downlink symbols without any uplink symbol, configuring, by the second base station, each of the uplink symbols in the subframe of the second base station as the blank symbol.

4. The method of claim 3, further comprising:

when the symbol configuration information of the second base station includes an unspecified symbol and the symbol configuration information of the first base station does not include an unspecified symbol, configuring, by the second base station, the unspecified symbol at a position corresponding to a downlink symbol of the first base station as the blank symbol; or when the symbol configuration information of the first base station includes an unspecified symbol and the symbol configuration information of the second base station does not include an unspecified symbol, determining, by the second base station, a position of the unspecified symbol, and configuring, by the second base station, an uplink symbol corresponding to the position of the unspecified symbol in the subframe of the second base station as the blank symbol; or when both the symbol configuration information of the second base station and the first base station includes an unspecified symbol, configuring, by the second base station, the unspecified symbol of the second base station at a position corresponding to a downlink symbol of the first base station as the blank symbol, determining, by the second base station, an uplink symbol at a position corresponding to the unspecified symbol of the first base station in the subframe of the second station, and configuring, by the second base station, the uplink symbol at the corresponding position as the blank symbol.

5. The method of claim 1, wherein the communicating, by the second base station, according to the configured symbol configuration information comprises:

transmitting, by the second base station, the configured symbol configuration information to a user equipment (UE), such that the UE does not communicate on the blank symbol; or transmitting, by the second base station, the configured symbol configuration information to a user equipment (UE), such that the UE communicates on the blank symbol with a predetermined power.

6. The method of claim 1, wherein the first base station is a micro base station within coverage of the second base station; or the first base station is a macro base station having overlap coverage with the second base station; or the first base station is adjacent to the second base station.

7. A communication apparatus applied to a second base station, comprising:

a processor; and a memory for storing instructions executable by the processor;

wherein the processor is configured to:

receive symbol configuration information of a first base station, wherein the symbol configuration information of the first base station is used to indicate an uplink/downlink symbol configuration in a subframe of the first base station;

configure symbol configuration information of the second base station by configuring a specified symbol in a subframe of the second base station as a blank symbol, according to the symbol configuration information of the first base station and the symbol configuration information of the second base station, wherein the specified symbol is a symbol that is predicted to cause interference or to be intervened during communication; and communicate according to the configured symbol configuration information of the second base station, wherein the processor is further configured to:

when the symbol configuration information of the first base station does not comprise all symbol configuration information in the subframe of the first base station, determine a position of a target symbol and configure an uplink symbol corresponding to the position of the target symbol in the subframe of the second base station as the blank symbol, wherein the target symbol is a symbol that is not included in the symbol configuration information in the subframe of the first base station.

8. The apparatus of claim 7, wherein the processor is configured to:
  receive the symbol configuration information sent by the first base station after establishment of the second base station.

9. The apparatus of claim 7, wherein the processor is configured to:
  when the subframes of both the first base station and the second base station comprise one or more uplink symbols and downlink symbols, determine one or more overlap positions of the one or more uplink symbols of the second base station and the one or more downlink symbols of the first base station and configure one or more uplink symbols at the one or more overlap positions as the blank symbol; or
  when the subframe of the first base station comprises one or more uplink symbols and downlink symbols and the subframe of the second base station comprises one or more uplink symbols without any downlink symbol, configure each of the uplink symbols in the subframe of the second base station as the blank symbol; or
  when the subframe of the second base station comprises one or more uplink symbols and downlink symbols and the subframe of the first base station comprises one or more downlink symbols without any uplink symbol, configure each of the uplink symbols in the subframe of the second base station as the blank symbol.

10. The apparatus of claim 9, wherein the processor is further configured to:
  when the symbol configuration information of the second base station includes an unspecified symbol and the symbol configuration information of the first base station does not include an unspecified symbol, configure the unspecified symbol at a position corresponding to a downlink symbol of the first base station as the blank symbol; or
  when the symbol configuration information of the first base station includes an unspecified symbol and the symbol configuration information of the second base station does not include an unspecified symbol, determine a position of the unspecified symbol and configure an uplink symbol corresponding to the position of the unspecified symbol in the subframe of the second base station as the blank symbol; or
  when both the symbol configuration information of the second base station and the first base station include an unspecified symbol, configure the unspecified symbol of the second base station at a position corresponding to a downlink symbol of the first base station as the blank symbol, determine an uplink symbol at a position corresponding to the unspecified symbol of the first base station in the subframe of the second station, and configure the uplink symbol at the corresponding position as the blank symbol.

11. The apparatus of claim 7, wherein the processor is configured to:
  transmit the configured symbol configuration information to a user equipment (UE), such that the UE does not communicate on the blank symbol; or
  transmit the configured symbol configuration information to a user equipment (UE), such that the UE communicates on the blank symbol with a predetermined power.

12. The apparatus of claim 7, wherein the first base station is a micro base station within coverage of the second base station; or the first base station is a macro base station having overlap coverage with the second base station; or the first base station is adjacent to the second base station.

13. The method of claim 1, wherein the receiving, by the second base station, the symbol configuration information of the first base station comprises:
  receiving, by the second base station, the symbol configuration information sent by the first base station after a change of symbol configuration information of the first base station.

14. The method of claim 1, wherein the receiving, by the second base station, the symbol configuration information of the first base station comprises:
  receiving, by the second base station, the symbol configuration information sent by the first base station after a change of business requirement of the first base station.

15. The apparatus of claim 7, wherein the processor is configured to:
  receive the symbol configuration information sent by the first base station after a change of symbol configuration information of the first base station.

16. The apparatus of claim 7, wherein the processor is configured to:
  receive the symbol configuration information sent by the first base station after a change of business requirement of the first base station.

17. A non-transitory computer-readable storage medium having instructions stored thereon, the instructions, when executed by a processor, cause the processor to perform a communication method applied to a second base station, the communication method comprising:
  receiving, by the second base station, symbol configuration information of a first base station, wherein the symbol configuration information of the first base station is used to indicate an uplink/downlink symbol configuration in a subframe of the first base station;
  configuring, by the second base station, symbol configuration information of the second base station by configuring a specified symbol in a subframe of the second base station as a blank symbol according to the symbol configuration information of the first base station and the symbol configuration information of the second base station, wherein the specified symbol is a symbol that is predicted to cause interference or to be intervened during communication; and
  communicating, by the second base station, according to the configured symbol configuration information of the second base station,
  wherein the communication method further comprises:
    when the symbol configuration information of the first base station does not comprise all symbol configuration information in the subframe of the first base station, determining, by the second base station, a position of a target symbol and configuring, by the second base station, an uplink symbol corresponding to the position of the target symbol in the subframe of the second base station as the blank symbol, wherein the target symbol is a symbol that is not included in the symbol configuration information in the subframe of the first base station.

* * * * *